United States Patent
Yu et al.

(10) Patent No.: US 11,822,894 B1
(45) Date of Patent: Nov. 21, 2023

(54) INTEGRATING COMMON AND CONTEXT-SPECIFIC NATURAL LANGUAGE UNDERSTANDING PROCESSING IN A VIRTUAL ASSISTANT APPLICATION

(71) Applicant: FMR LLC, Boston, MA (US)

(72) Inventors: Christopher Yu, Lexington, MA (US); Elizabeth Burke, Raleigh, NC (US); Sheebarani Muthukrishnan, Coppell, TX (US); Jyothi Turpu, Quincy, MA (US); Steven Simons, Boston, MA (US); Murali Mohan Aravapalli, Apex, NC (US); Ajay Ganapathiraju, Morrisville, NC (US)

(73) Assignee: FMR LLC, Boston, MA (US)

(*) Notice: Subject to any disclaimer, the term of this patent is extended or adjusted under 35 U.S.C. 154(b) by 0 days.

(21) Appl. No.: 18/091,536

(22) Filed: Dec. 30, 2022

(51) Int. Cl.
*G06F 40/35* (2020.01)
*G06F 18/2415* (2023.01)

(52) U.S. Cl.
CPC .......... *G06F 40/35* (2020.01); *G06F 18/2415* (2023.01)

(58) Field of Classification Search
CPC .............................. G06F 40/35; G06F 18/2415
USPC .................................................. 704/9
See application file for complete search history.

(56) References Cited

U.S. PATENT DOCUMENTS

| | | | | |
|---|---|---|---|---|
| 8,767,948 B1* | 7/2014 | Riahi | ................. | H04M 3/5175 379/266.01 |
| 10,453,117 B1* | 10/2019 | Reavely | ................. | G06N 5/027 |
| 10,475,451 B1* | 11/2019 | Lynch | ................. | G10L 15/30 |
| 10,540,965 B2* | 1/2020 | Gandrabur | ................. | G10L 15/1815 |
| 10,970,487 B2* | 4/2021 | Sapugay | ................. | G06F 40/211 |
| 11,016,968 B1* | 5/2021 | Hoover | ................. | G10L 15/22 |
| 11,132,509 B1* | 9/2021 | Pasko | ................. | G06F 18/214 |
| 11,176,210 B1* | 11/2021 | Miller | ................. | G06F 16/9577 |
| 11,176,936 B2* | 11/2021 | Mathias | ................. | G06F 40/295 |
| 11,205,052 B2* | 12/2021 | Sapugay | ................. | G06F 40/216 |

(Continued)

OTHER PUBLICATIONS

T. Mikolov et al., "Efficient Estimation of Word Representations in Vector Space," arXiv:1301.3781v3 [cs.CL] Sep. 7, 2013, 12 pages.

(Continued)

*Primary Examiner* — Edwin S Leland, III
(74) *Attorney, Agent, or Firm* — Cesari & McKenna, LLP

(57) ABSTRACT

Methods and apparatuses are described for integrating common and context-specific natural language understanding (NLU) processing in a virtual assistant application. A server identifies a common NLU processing unit comprising (i) a common NLU classification model and (ii) a common response library comprising common responses. The server builds a combined NLU processing unit based upon the common NLU classification model and a context-specific NLU classification model, the combined NLU processing unit comprising (i) a combined NLU classification model trained using the common NLU training data and context-specific NLU training data, (ii) the common response library and (iii) a context-specific response library comprising context-specific responses. The server generates a response to an input utterance by determining a user intent associated with the input utterance using the combined NLU classification model, locating a response associated with the user intent in one or more of the libraries.

18 Claims, 5 Drawing Sheets

(56) References Cited

U.S. PATENT DOCUMENTS

| | | | | |
|---|---|---|---|---|
| 11,211,056 | B1* | 12/2021 | Bissell | G10L 15/30 |
| 11,403,345 | B2* | 8/2022 | Kim | G10L 15/1822 |
| 2012/0251011 | A1* | 10/2012 | Gao | G06V 20/20 |
| | | | | 382/224 |
| 2014/0314225 | A1* | 10/2014 | Riahi | H04L 51/02 |
| | | | | 379/265.09 |
| 2015/0370787 | A1* | 12/2015 | Akbacak | G06F 40/47 |
| | | | | 704/2 |
| 2017/0372200 | A1* | 12/2017 | Chen | G06N 3/044 |
| 2018/0174020 | A1* | 6/2018 | Wu | G06N 3/08 |
| 2018/0174055 | A1* | 6/2018 | Tirumale | H04L 51/04 |
| 2019/0019160 | A1* | 1/2019 | Champaneria | G06N 5/04 |
| 2019/0042988 | A1* | 2/2019 | Brown | G06N 5/022 |
| 2019/0087455 | A1* | 3/2019 | He | G06F 40/295 |
| 2019/0095927 | A1* | 3/2019 | Shimpi | G06N 5/025 |
| 2019/0295537 | A1* | 9/2019 | Sapugay | G10L 15/19 |
| 2019/0370398 | A1* | 12/2019 | He | G06N 20/00 |
| 2019/0377796 | A1* | 12/2019 | Datla | G06F 40/30 |
| 2019/0378506 | A1* | 12/2019 | Garikapati | G10L 15/22 |
| 2020/0051568 | A1* | 2/2020 | Nicholls | G10L 15/22 |
| 2020/0251091 | A1* | 8/2020 | Zhao | G06N 5/022 |
| 2020/0380963 | A1* | 12/2020 | Chappidi | G10L 15/063 |
| 2021/0090570 | A1* | 3/2021 | Aharoni | H04M 1/02 |
| 2021/0104235 | A1* | 4/2021 | Radtke | G06F 16/3344 |
| 2021/0104236 | A1* | 4/2021 | Doggett | G10L 15/1822 |
| 2021/0224485 | A1* | 7/2021 | Sapugay | G06N 3/006 |
| 2021/0350209 | A1* | 11/2021 | Wang | G06F 16/63 |
| 2022/0076666 | A1* | 3/2022 | Trehan | G10L 15/22 |
| 2022/0215405 | A1* | 7/2022 | Chun | H04L 63/0815 |
| 2022/0222489 | A1* | 7/2022 | Liu | G06N 20/00 |
| 2022/0292346 | A1* | 9/2022 | Mimassi | G06F 40/30 |
| 2023/0016962 | A1* | 1/2023 | Ramanna | G06N 20/20 |
| 2023/0071274 | A1* | 3/2023 | Trehan | G06F 3/167 |
| 2023/0074653 | A1* | 3/2023 | Mawson | G06Q 20/0855 |
| 2023/0084583 | A1* | 3/2023 | Zeng | G06F 40/35 |
| | | | | 704/243 |

OTHER PUBLICATIONS

J. Pennington et al., "GloVe: Global Vectors for Word Representation," Proceedings of the 2014 Conference on Empirical Methods in Natural Language Processing (EMNLP), pp. 1532-1543, Oct. 25-29, 2014, Doha, Qatar.

A. Abdellatif et al., "A Comparison of Natural Language Understanding Platforms for Chatbots in Software Engineering," arXiv:2012.02640v2 [cs.SE] Jul. 22, 2021, 19 pages.

* cited by examiner

INTEGRATING COMMON AND CONTEXT-SPECIFIC NATURAL LANGUAGE UNDERSTANDING PROCESSING IN A VIRTUAL ASSISTANT APPLICATION

TECHNICAL FIELD

This application relates generally to methods and apparatuses, including computer program products, for integrating common and context-specific natural language understanding (NLU) processing in a virtual assistant application.

BACKGROUND

Automated conversation software that utilizes Natural Language Understanding (NLU) frameworks enables businesses to dynamically scale customer support offerings. Many NLU frameworks exist for organizations to use in generating automated customer service applications, such as chatbots and virtual assistant (VA) applications. Typically, these frameworks are context-agnostic tools that are designed to work off-the-shelf with the organization's own user intent training data and user experience configuration. However, these frameworks are very limited in their ability to adapt to different, context-specific VA applications— particularly when the same organization wants to use the NLU framework for multiple, independent customer service applications or channels that may have differing contexts.

In addition, use of a singular NLU framework for multiple channels or contexts can result in the VA application providing inaccurate or conflicting information to the same customer in the different contexts or channels. As a result, a user may simply stop using the VA application after failing to receive an accurate response and instead place a phone call or send an email to a live customer service representative at a call center, who must then gather information about the user's request and try to provide a satisfactory response. As a result, the enterprise must incur significant costs in staffing of customer service centers such that the customer expends unproductive time searching for a response, ultimately having a suboptimal experience—leading to frustration with the enterprise.

Another challenge in deploying NLU frameworks arises from the perspective of development teams in a single organization that are building VA applications/chatbots and want to leverage a common NLU platform in different domains or contexts. To provide robust functionality, a large set of training data and manual curation in each domain is typically required in order to be reasonably accurate in classifying user intent with a single NLU platform. In practice, larger organizations need to expend considerable effort to amass a well-trained and effective NLU framework due to the complexities of language. Language is ambiguous and constantly changing. Words and phrases can take on different meanings depending on the context they are used in. Humans can handle this ambiguity by pulling on past experiences and interactions, but an NLU framework has a much harder time. Additionally, new words and phrases are added to a language regularly and an NLU framework generally needs to be updated often to remain current. Due to these complexities, NLU frameworks must be manually reviewed and retrained continuously to ensure accuracy and improved conversational experiences.

As such, organizations often employ multiple development teams that collaborate on a common NLU framework, but using these off-the-shelf offerings, these teams must work within the same model, artifact, or bot. One team may want to make changes to one or more aspects of the bot, but the team may be prevented or limited in making these changes due to the requirements and needs of other teams. As can readily be appreciated, typical off-the-shelf offerings have a lack of mature support for the following: concurrent editing by different teams/people; different responses authored per team/experience; frequent, unsynchronized deployment schedules per team/experience; version-controlled deployment per team/experience; and maintaining consistent performance across separate experiences/teams.

When multiple teams try to leverage a common NLU by operating within the same model, artifact, or bot but want to differentiate the responses that they return to the end user, the inability to perform the previously-referenced tasks results in a need for significant planning, execution, and deployment coordination across teams. This high level of coordination is difficult to attain and maintain at scale and inevitably, teams face the following issues: 1. Conflicting changes between teams during editing; 2. Accidental deployment of incomplete content by another delivery team; 3. Overcomplex deployment strategies to avoid affecting another team. These issues make delivery of automated conversation software slow, error prone, more expensive, and less effective.

SUMMARY

Therefore, what is needed are methods and systems that enable cross-team collaboration to generate a common, well-trained NLU artifact through the combination of off-the-shelf NLU offerings (e.g., vendor, proprietary, or open source) with team-specific, independent artifact experiences without necessitating the intensive synchronization of team deployment schedules. As described herein, the techniques advantageously provide for separation of NLU artifact training from context-specific and common response generation to create a process of managing, delivering, and enhancing NLU artifacts over multiple development teams, deployment contexts, and customer experiences.

Using the approach described herein, a common NLU artifact can be utilized by many different teams. As a result, multiple teams with similar experiences could choose to leverage a commonly-managed NLU artifact, while maintaining operational independence. Also, for any given experience, the time needed to deploy the combined NLU artifact decreases while the quality of the experience increases. Teams are able to quickly implement a trained and tested off-the-shelf NLU, allowing them to spend their time focused on their experience specific responses for their users. The ability for these teams to choose which NLU they would like to reference helps improve the overall experience as well. The teams can choose separate chatbots that contain different NLUs to compare the performance across different options. In addition, the combined NLU artifact described herein also makes it easier for teams to build for multiple locales. In some embodiments, teams only have to translate a single combined NLU artifact instead of having to separately perform translations for all chatbots. Thus, the NLU-based experience reaches customers more quickly and provides an improved experience for customers who want to chat with the chatbot in a different language.

The invention, in one aspect, features a computer system for integrating common and context-specific natural language understanding (NLU) processing in a virtual assistant application. The system comprises a server computing device having a memory that stores computer-executable instructions and a processor that executes the computer-executable instructions. The server computing device identifies a common NLU processing unit comprising (i) a common NLU classification model trained to determine user intent from an input utterance and (ii) a common response library comprising a plurality of common responses each associated with a user intent. The server computing device builds a combined NLU processing unit based upon the common NLU classification model and a context-specific NLU classification model, the combined NLU processing unit comprising (i) a combined NLU classification model trained using the common NLU training data and context-specific NLU training data to determine user intent from an input utterance, (ii) the common response library and (iii) a context-specific response library comprising a plurality of context-specific responses each associated with a user intent. The server computing device generates, using the context-specific NLU processing unit, a response to an input utterance captured from a user of a client computing device by determining a user intent associated with the input utterance using the combined NLU classification model and locates a response associated with the user intent in one or more of the context-specific response library and the common response library. The server computing device transmits the located response to the client computing device.

The invention, in another aspect, features a computerized method of integrating common and context-specific natural language understanding (NLU) processing in a virtual assistant application. A server computing device identifies a common NLU processing unit comprising (i) a common NLU classification model trained to determine user intent from an input utterance and (ii) a common response library comprising a plurality of common responses each associated with a user intent. The server computing device builds a combined NLU processing unit based upon the common NLU classification model and a context-specific NLU classification model, the combined NLU processing unit comprising (i) a combined NLU classification model trained using the common NLU training data and context-specific NLU training data to determine user intent from an input utterance, (ii) the common response library and (iii) a context-specific response library comprising a plurality of context-specific responses each associated with a user intent. The server computing device generates, using the context-specific NLU processing unit, a response to an input utterance captured from a user of a client computing device by determining a user intent associated with the input utterance using the combined NLU classification model and locates a response associated with the user intent in one or more of the context-specific response library and the common response library. The server computing device transmits the located response to the client computing device.

Any of the above aspects can include one or more of the following features. In some embodiments, the server computing device merges the common NLU training data with the context-specific NLU training data and trains a new NLU classification model to determine user intent from an input utterance using the merged training data set. In some embodiments, the input utterance is captured from the client computing device during a virtual assistant communication session. In some embodiments, determining a user intent associated with the input utterance using the combined NLU classification model comprises applying the combined NLU classification model to the input utterance to generate a predicted user intent for the input utterance, and labeling the input utterance with the predicted user intent.

In some embodiments, locating a response associated with the user intent in one or more of the context-specific response library and the common response library comprises locating a first response associated with the user intent in the context-specific response library, and locating a second response associated with the user intent in the common response library when a first response is not located in the context-specific response library. In some embodiments, the client computing device outputs the located response to a user of the client computing device via a virtual assistant application on the client computing device. In some embodiments, when a first response is not located in the context-specific response library and a second response is not located in the common response library, the server computing device returns a default response. In some embodiments, the default response indicates to a user of the client computing device that the user intent is not understood. In some embodiments, identifying a common NLU processing unit comprises selecting a common NLU processing unit from a plurality of common NLU processing units, each associated with a different version number.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
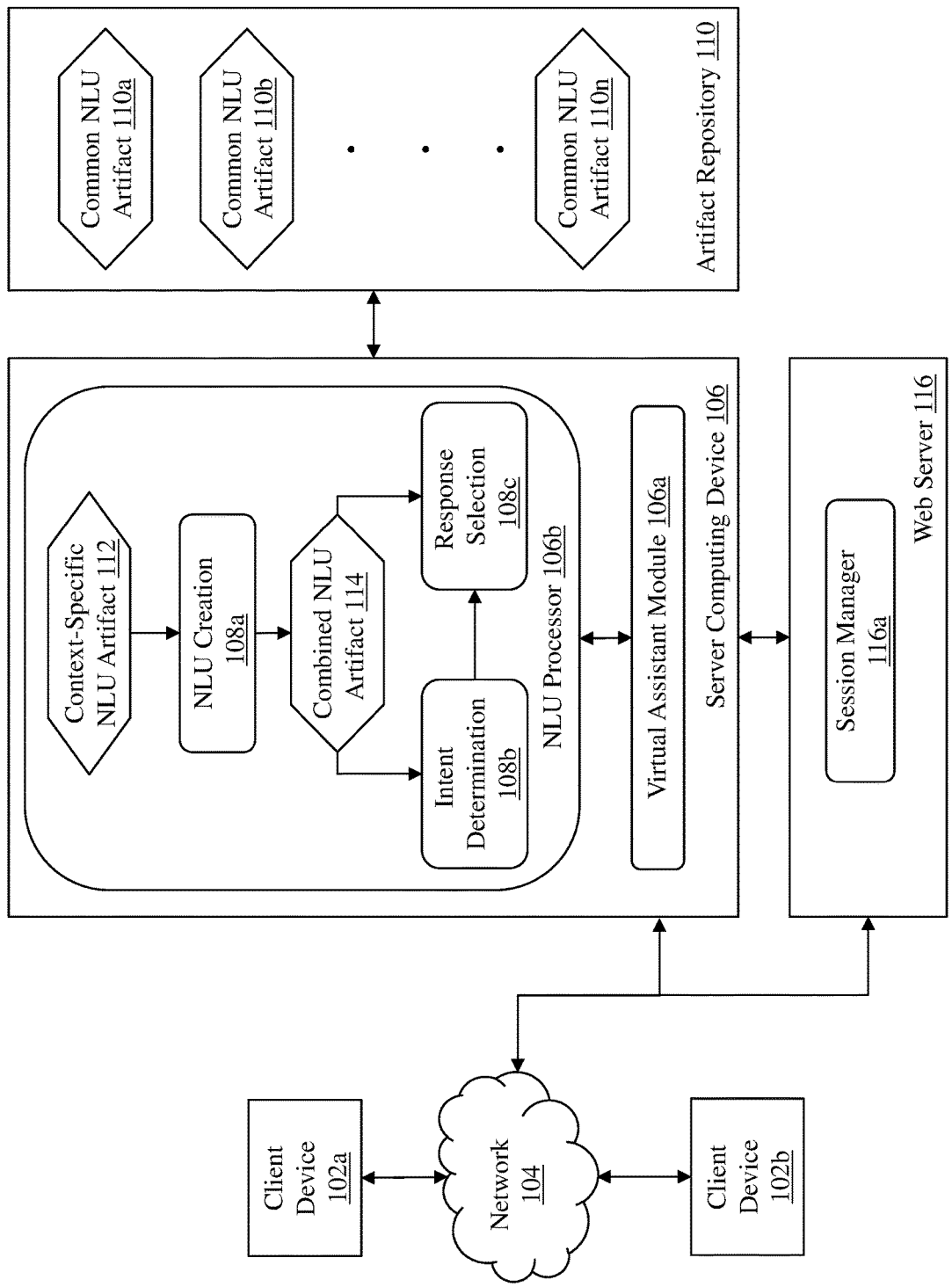
FIG. 1 is a block diagram of a system for integrating common and context-specific natural language understanding (NLU) processing in a virtual assistant application.

FIG. 1 is a block diagram of a system 100 for integrating common and context-specific NLU processing in a virtual assistant application. System 100 includes client computing devices 102a-102b, communication network 104, server computing device 106 that includes virtual assistant (VA) module 106a, and natural language understanding (NLU) processor 106b which includes NLU creation module 108a, intent determination module 108b, response selection module 108c, context-specific NLU artifact 112, and combined NLU artifact 114, artifact repository 110 that includes a plurality of common NLU artifacts 110a-110n. System further comprises web server computing device 116 that includes session manager 116a.

Client computing devices 102a-102b connect to communication network 104 in order to communicate with web server 116 to participate in one or more web browsing sessions. As can be appreciated, web server 116 can be configured to host one or more websites and/or connect to other computing devices that provide web-related content to client computing devices 102a-102b. For example, client computing devices 102a-102b can establish a communication session with session manager 116a of web server 116 (e.g., via HTTP or HTTPS) using a uniform resource locator (URL) assigned to web server 116 and receive website content from web server 116. A user at client computing device 102a-102b can interact with (e.g., browse) the website by activating links and navigating through various pages of the website. In some embodiments, each page or section of the website is associated with a particular URL. In some embodiments, client computing devices 102a-102b are each coupled to an associated display device (not shown). For example, client computing devices 102a-102b can provide a graphical user interface (GUI) via the display device that is configured to receive input from a user of the corresponding device 102a-102b and to present output (e.g., website content) to that user. In some embodiments, client computing devices 102a-102b can be configured to connect to server computing device 106 via network 104.

Exemplary client computing devices 102a-102b include but are not limited to desktop computers, laptop computers, tablets, mobile devices, smartphones, and Internet appliances. It should be appreciated that other types of computing devices that are capable of connecting to the components of system 100 can be used without departing from the scope of invention. Although FIG. 1 depicts two client computing devices 102a-102b, it should be appreciated that system 100 can include any number of client computing devices.

Communication network 104 enables client computing devices 102a-102b to communicate with server computing device 106 and/or web server computing device 116. Network 104 is typically a wide area network, such as the Internet and/or a cellular network. In some embodiments, network 104 is comprised of several discrete networks and/or sub-networks (e.g., cellular to Internet).

Server computing device 106 is a computing device including specialized hardware and/or software modules that execute on a processor and interact with memory modules of server computing device 106, to receive data from other components of system 100, transmit data to other components of system 100, and perform functions for context-specific NLU processing in a virtual assistant application as described herein. Server computing device 106 includes virtual assistant (VA) module 106a, and natural language understanding (NLU) processor 106b which includes NLU creation module 108a, intent determination module 108b, and response selection module 108c which can execute on one or more processors of server computing device 106. As mentioned above, NLU processor 106b also includes context-specific NLU artifact 112 and combined NLU artifact 114. In some embodiments, modules 106a-106b and artifacts 112, 114 are specialized sets of computer software instructions programmed onto one or more dedicated processors in server computing device 106 and can include specifically designated memory locations and/or registers for executing the specialized computer software instructions.

Although modules 106a-106b and artifacts 112, 114 are shown in FIG. 1 as executing within the same server computing device 106, in some embodiments the functionality of modules 106a-106b and artifacts 112, 114 can be distributed among a plurality of server computing devices. As shown in FIG. 1, server computing device 106 enables modules 106a-106b and artifacts 112, 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 106a-106b and artifacts 112, 114 is described in detail throughout the specification.

Artifact repository 110 is a computing device (or in some embodiments, a set of computing devices) coupled to server computing device 106. Artifact repository 110 comprises a plurality of common NLU artifacts 110a-110n. In some embodiments, artifact repository 110 can be integrated with server computing device 106 or can be located on a separate computing device or devices. For example, artifact repository 110 can utilize a software development and/or code repository platform to store and manage common NLU artifacts 110a-110n.

In some embodiments, artifacts 110a-110n, 112, and 114 are machine learning classification models configured to receive vectors and/or embeddings that are representative of an input utterance (e.g., as received from one or more of the client computing devices 102a-102b) and generate a user intent and/or user intent prediction based upon the input utterance. The user intent is then used by response selection module 108c to generate a response message to the input utterance that is transmitted back to client computing device 102a-102b via virtual assistant (VA) module 106a. In some examples, NLU processor 106a converts an input utterance into embeddings or vectors using one or more word embedding algorithms, such as word2vec (as described in T. Mikolov et al., "Efficient Estimation of Word Representations in Vector Space," arXiv:1301.3781v3 [cs.CL] 7 Sep. 2013) or GloVe (as described in J. Pennington et al., "GloVe: Global Vectors for Word Representation," Proceedings of the 2014 Conference on Empirical Methods in Natural Language Processing (EMNLP), October 2014, pp. 1532-1543).

For example, artifacts 110a-110n, 112, and 114 can comprise algorithms that are executed on the utterance embeddings to determine predictions of user intent based upon the input. As can be appreciated, artifacts 110a-110n, 112, and 114 can be trained on existing utterance data and correlated known user intents in order to enhance the accuracy of the prediction values generated by artifacts 110a-110n, 112, and 114. Also, as additional input utterances data and related subsequent intents and responses are collected by system 100 over time, this additional data can be used to re-train artifacts 110a-110n, 112, and 114 for a further increase in accuracy and performance.

For example, common NLU artifacts 110a-110n can comprise off-the-shelf NLU processing units or algorithms that may be applicable to a wide range of natural language input but are not specifically trained to recognize user intent from application-specific or context-specific input utterances and do not comprise application-specific and context-specific responses to the determined intent. Exemplary common NLU artifacts 110a-110n can include, but are not limited to: IBM® Watson™ available from IBM Corp.; Google® Dialogflow™ available from Google, Inc.; Rasa™ available from; and Microsoft® LUIS™ available from Microsoft Corp. Further detail on these types of NLUs is described in A. Abdellatif et al., "A Comparison of Natural Language Understanding Platforms for Chatbots in Software Engineering," arXiv:2012.02640v2 [cs.SE] 22 Jul. 2021. In some embodiments, one or more of the common NLU artifacts 110a-110n can comprise a proprietary classification model and response library that is trained on certain organization-specific or business-specific input utterances to generate customized responses. For example, context-specific NLU artifact 112 can be stored in artifact repository 110 as a common NLU artifact to be used by others in the organization when developing their own virtual assistants. In this way, NLU development teams from across the organization can leverage this type of common NLU artifact to further refine and customize the intent determination and response generation to more granular context-specific use cases or applications.

In some embodiments, common NLU artifacts 110a-110n comprise classification models and corresponding response libraries that are not specific to a particular application context. In some embodiments context-specific NLU artifact 112 can comprise a classification model and corresponding response library that is trained to determine context-specific intent (e.g., for a particular application context, a particular organization context, and/or a particular business context) for an input user utterance and generate context-specific responses. In some embodiments, NLU processor 106b generates combined NLU artifact 114 using each of (i) one or more common NLU artifacts 110a-110n and (ii) one or more context-specific NLU artifacts 112. Combined NLU artifact 114 comprises a classification model that is trained using the training sets for both the common NLU artifact(s) and the context-specific NLU artifact(s) to determine an intent associated with an input utterance. Combined NLU artifact 114 also includes a common response library from the common NLU artifact(s) and a context-specific response library from the context-specific NLU artifact(s). As will be described in greater detail below, when executed, combined NLU artifact 114 can determine a user intent associated with an input utterance and leverage both the common and context-specific response libraries to determine a suitable response to the utterance.

Web server computing device 116 is a computing device (or set of computing devices) to which client computing devices 102a-102b can connect to retrieve and display digital content items (such as web pages). Web server 116 is a combination of hardware, including one or more special-purpose processors and one or more physical memory modules, and specialized software modules (such as session manager 116a) that are executed by a processor of web server 116. Typically, a website comprises a plurality of visual and non-visual elements that make up the content transmitted and displayed to a user when, e.g., browser software on client computing devices 102a-102b connects to web server 116 via communication network 104 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video). As can be understood, in some embodiments each page of a website is associated with a particular URL that identifies the page's location and provides a mechanism for retrieving the page for display on client computing devices 102a-102b. Session manager 116a is configured to establish browsing sessions with client computing devices 102a-102b and record session-related information (such as pages visited, URLs accessed, timestamps, page sequencing, and the like) for each user/client device. In some embodiments, session manager 116a records the browsing session information in, e.g., a database. As an example, web server 116 can establish a connection to VA module 106a of server computing device 106 upon request from a user of client computing device 102a-102b and/or automatically when triggered by one or more events occurring during a communication session between client computing device 102a-102b and web server 116 (e.g., loading one or more web pages, an amount of time elapsed from the last user action, etc.). It should be appreciated that, in some embodiments, one or more of the client computing devices 102a-102b can establish a virtual assistant communication session directly with server computing device 106. For example, client computing device 102a can be a smart device (e.g., a smart speaker, an Internet-of-Things (IoT) device) that enables a user to communicate with a virtual assistant application using text chat or voice chat.

Figure 2:
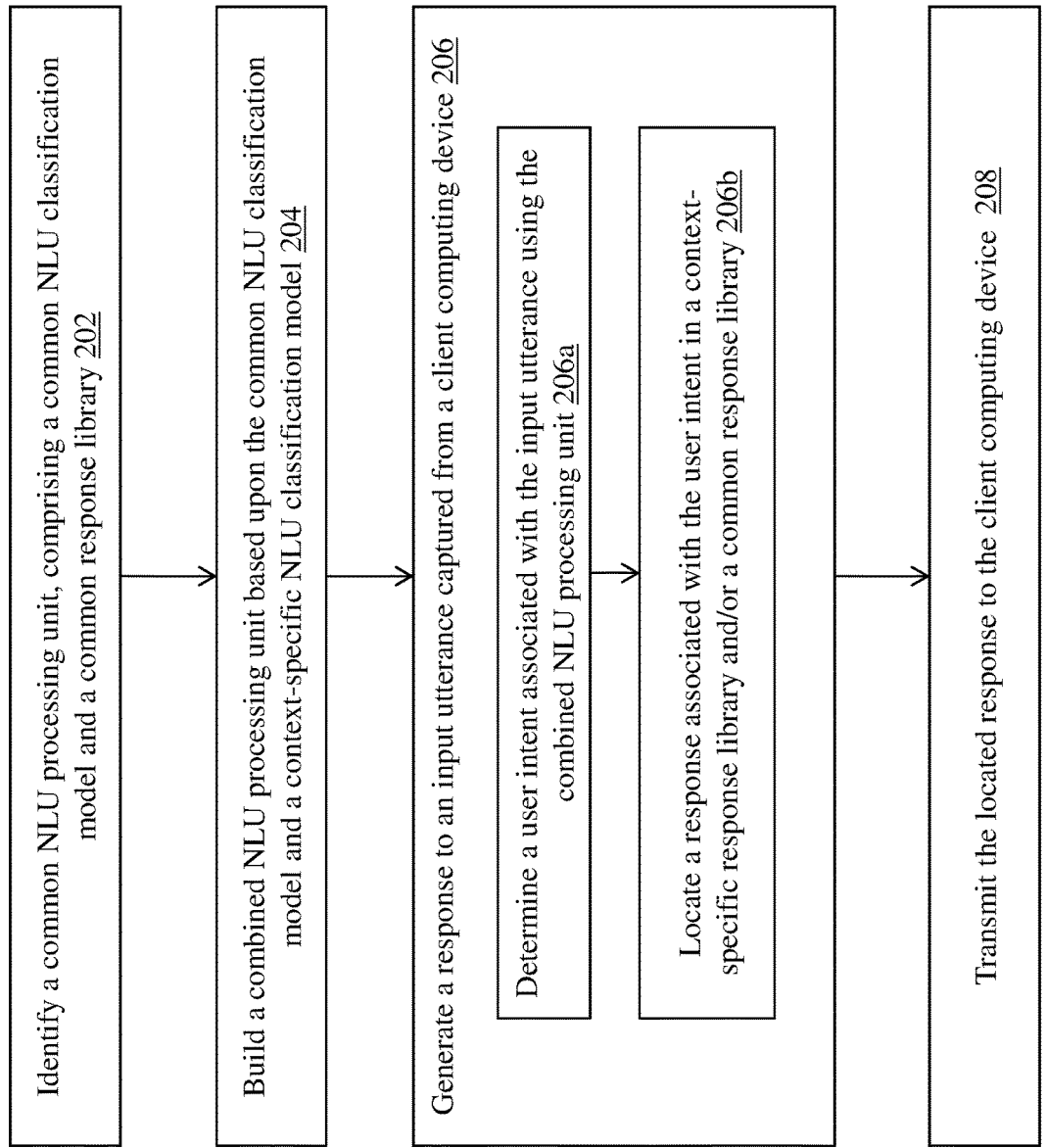
FIG. 2 is a flow diagram of a computerized method of integrating common and context-specific natural language understanding (NLU) processing in a virtual assistant application.

FIG. 2 is a flow diagram of a computerized method 100 of integrating common and context-specific natural language understanding (NLU) processing in a virtual assistant application, using system 100 of FIG. 1. A user at client computing device 102a, 102b can launch an application (e.g., app, browser, skill) to perform a variety of tasks, including but not limited to information retrieval from local and/or remote data sources such as web server 116. For example, when the application is a browser application, the user can interact with the application to access one or more websites and/or webpages (e.g., as hosted by web server 116) in order to view information and submit queries for retrieval of additional information.

In some embodiments, client computing devices 102a-102b include an application that executes on client computing devices 102a-102b to provide certain functionality to a user. In some embodiments, client computing devices 102a-102b can include a native application installed locally. For example, a native application is a software application (also called an 'app') that written with programmatic code designed to interact with an operating system that is native to client computing devices 102a-102b and provide information and application functionality (such as a VA client interface) to a user of client computing devices 102a-102b. In the example where client computing device 102a is a mobile device such as a smartphone, the native application software is available for download from, e.g., the Apple® App Store or the Google® Play Store. In some embodiments, the native application includes a software development kit (SDK) module that is executed by a processor of client computing devices 102a-102b. In other embodiments, client computing devices 102a-102b can include a browser application that runs on the remote computing device 102 and connects to one or more other computing devices (e.g., web server 116) for retrieval and display of information and application functionality (such as conducting a virtual assistant communication session with VA module 106b). In one example, the browser application enables client computing devices 102a-102b to communicate via HTTP or HTTPS with web server 116 (e.g., via a URL) to receive website-related content, including one or more webpages, for rendering in the browser application and presentation on a display device coupled to client computing devices 102a-102b. Exemplary browser application software includes, but is not limited to, Firefox™, Chrome™, Safari™, and other similar software. The one or more webpages can comprise visual and audio content for display to and interaction with a user.

In some instances, the information that the customer is seeking may not be readily available or the customer may have additional questions that he or she cannot resolve using only the information provided by the application. In these instances, the customer may want to conduct a chat-based communication session with VA module 106a of server computing device 106. For example, a customer at client computing device 102a, 102b may want to receive real-time, automated assistance in resolving a problem, performing a transaction, or answering a question. The customer at device 102a, 102b submit a request via web server 116 for VA services, or the customer can launch an app or interact with the browser to initiate a network connection (e.g., HTTP) directly to VA module 106a on server computing device 106.

As can be appreciated, a main goal of many virtual assistant applications such as VA module 106a is to parse incoming user messages (e.g., text chat messages, voice chat messages), process the messages using NLU processor 106b to understand the user's input, determine a possible or likely user intent for the messages, and generate one or more responses to the user messages (e.g., providing information, answering a question, initiating a transaction, etc.) that satisfies the user intent and in some cases, continues the conversation flow. The input user messages are also referred to as 'utterances,' although they need not be spoken verbally by the user.

As mentioned above, there may be instances where an 'off'-the-shelf NLU processor does not provide satisfactory responses to all user utterances, particularly when the user is looking for context-specific information (such as from a specific organization or for a specific application). In these instances, it is beneficial to provide an NLU processor that is trained to recognize context-specific user intent and respond appropriately. However, also as mentioned above, requiring each development team or business unit within an organization to design and deploy a separate NLU processor to handle customer inquiries that may arise in the same or similar contexts, applications, or contact channels results in duplication of effort and longer time to production. In addition, the inability to leverage common NLU processing (whether off-the-shelf or proprietary within an organization) can result in an inconsistent end user experience, leading to frustration and disuse of the VA interface. For example, a user may provide the same utterance to two different VA modules operated by the same organization but developed by different teams. Each VA module may determine a different intent for the utterance and provide the user with inconsistent responses. To overcome this challenge, system 100 generates a combined NLU artifact 114 that includes a classification model trained on both one or more common NLU training sets and one or more context-specific NLU training sets and a plurality of response libraries that contain common and context-specific response messages. By allowing for creation of combined NLU artifacts, system enables each development team to integrate its own, context-specific NLU processing and responses to a baseline NLU processing artifact to augment the responsiveness and accuracy of the VA module 106a while enabling shorter development cycles. In some embodiments, one or more combined NLU artifacts 114 are generated prior to deploying VA module 106a to a production environment. In some embodiments, one or more combined NLU artifacts can be generated, trained, and deployed to respond to input user utterances during a particular chat-based communication session with client computing device 102a-102b.

In some embodiments, to create the combined NLU artifact 114, NLU creation module 108a of NLU processor 106b identifies (step 202) a common NLU processing unit comprising (i) a common NLU classification model trained to determine user intent from an input utterance and (ii) a common response library comprising a plurality of common responses each associated with a user intent. For example, NLU creation module 108a can select one or more common NLU artifacts 110a-110n from repository 110 to be used as a baseline NLU processing unit for the combined NLU artifact 114. As mentioned above, each common NLU artifact 110a-110n comprises an NLU classification model that is trained on a certain NLU training set to generate a prediction of user intent associated with an input utterance. For example, in an off-the-shelf common NLU artifact, the training set can be provided from the source along with the common NLU artifact. In another example, in a proprietary common NLU artifact, the training set can be stored in, e.g., a database or other central resource for development teams to access. Each common NLU artifact 110a-110n also includes a response library that comprises a plurality of messages that are responsive to given user intent(s) as determined by the associated classification model. In some embodiments, the response library includes a mapping between one or more user intents and one or more response messages.

Each common NLU artifact 110a-110n can be assigned an identifier or identifiers, such as name, version number, creation date, build date, source, and the like. These identifiers can be used to differentiate between different common NLU artifacts 110a-110n, so that development teams can link their specific VA applications to an identifiable common NLU artifact without the risk of another development team overwriting or modifying that common NLU artifact. In this sense, the concept of versioning can be applied to the common NLU artifacts 110a-110n—such that the following scenarios can be achieved:

1) Two or more separate development teams can use the same common NLU artifact; and
2) One development team can use a specific common NLU artifact 110a and another development team can use a different common NLU artifact 110b that are managed and versioned in a common repository.

Figure 3:
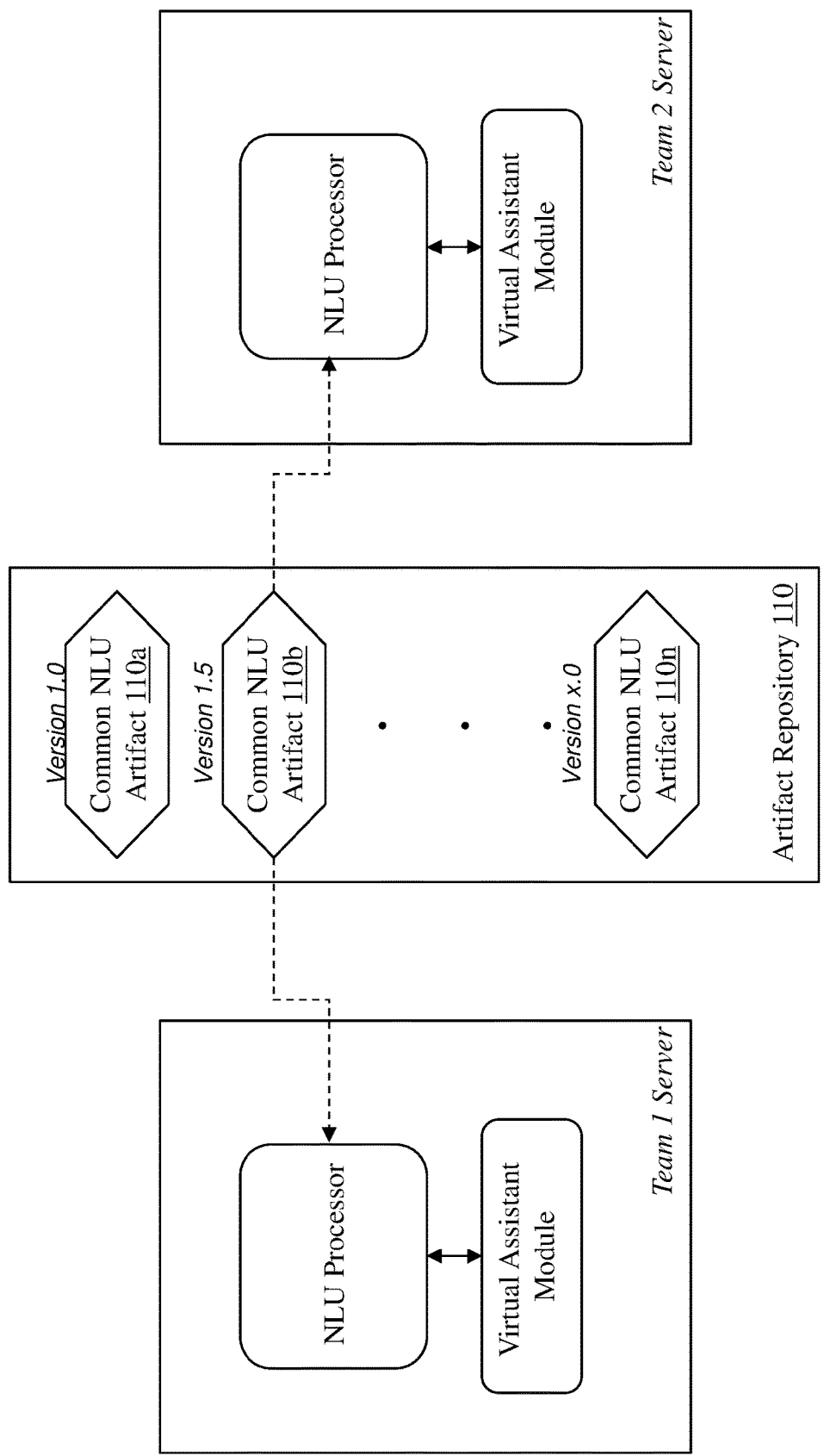
FIG. 3 is a block diagram of an illustrative embodiment of a single common NLU artifact used by different NLU processors and development teams.
Figure 4:
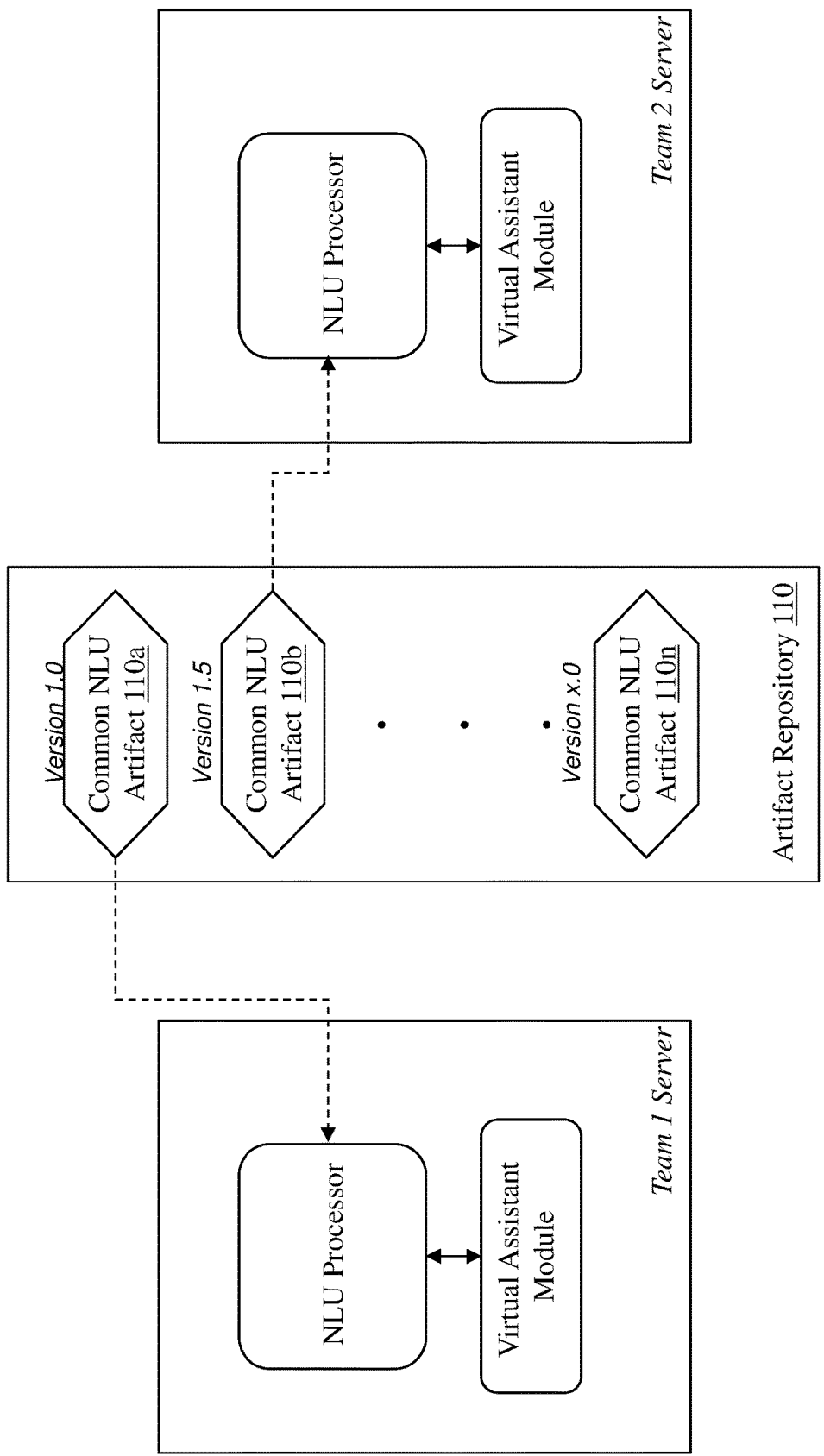
FIG. 4 is a block diagram of an illustrative embodiment of different common NLU artifacts used by different NLU processors and development teams.

FIG. 3 is a block diagram of an illustrative embodiment 300 of a single common NLU artifact used by different NLU processors and development teams. As shown in FIG. 3, Team 1 and Team 2 have each identified common NLU artifact 110b (version 1.5) for use with their individual NLU processors. FIG. 4 is a block diagram of an illustrative embodiment 300 of different common NLU artifacts used by different NLU processors and development teams. As shown in FIG. 4, Team 1 has identified common NLU artifact 110a (version 1.0) for use with their the NLU processor, while Team 2 has identified common NLU artifact 110b (version 1.5) for use with their NLU processor.

Using either approach, multiple development teams have the ability to leverage a common NLU artifact. Also, development teams with similar end user experiences could choose to leverage a commonly-managed NLU artifact, while maintaining operational independence. It should be appreciated that a common NLU artifact supporting multiple experiences is exposed to many more customer interactions than, e.g., per experience-NLU artifacts. Effort scaled across these multiple independent development teams to retrain the common NLU artifact using data captured during its use products a better-performing NLU artifact, which increases the efficiency of system 100 and provides for improved customer experiences.

After identifying a common NLU artifact 110a-110n, NLU creation module 108a builds (step 204) a context-specific NLU processing unit (i.e., combined NLU artifact 114) based upon the common NLU classification model from the selected common NLU artifact. The context-specific NLU processing unit includes (i) a combined NLU classification model based upon the common NLU classification model and a context-specific classification model trained to determine user intent from an input utterance, (ii) the common response library and (iii) a context-specific response library comprising a plurality of context-specific responses each associated with a user intent. In some embodiments, NLU creation module 108*a* retrieves the selected common NLU artifact 110*a* (including a corresponding training data set, trained classification model, and response library) from repository 110. NLU creation module 108*a* also generates a context-specific NLU artifact 112 (including a corresponding training data set, trained classification model, and response library). For example, NLU creation module 108*a* can train an NLU classification model using context-specific user utterances and known context-specific responses to predict user intent for one or more input utterances. Examples of context can include different domains, applications, conversation rulesets, business units, and the like.

In some embodiments, NLU creation module 108*a* connects the common NLU classification model and the context-specific NLU classification model so that when an input utterance is received, each of the common and context-specific NLU classification models generates a predicted user intent for the input utterance. Based upon the output from each classification model, intent determination module 108*b* can determine a user intent and response generation module 108*c* can determine a response messages, as will be described in detail below. In some embodiments, NLU creation module 108*a* generates a combined NLU classification model by training a new classification model using the training data sets from each of the common NLU artifact 110*a* and the context-specific NLU artifact 112. The result is a single NLU classification model that generates one or more user intents for a given input utterance, leveraging the training of both the common and context-specific models. Under either paradigm, combined NLU artifact 114 also includes a plurality of response libraries: the response library retrieved as part of the common NLU artifact 110*a* and the response library associated with the context-specific NLU artifact 112.

Turning back to FIG. 2, once NLU creation module 108*a* has built combined NLU artifact 114, the artifact 114 can be deployed to production for determining intent and generating responses for newly-received input utterances. Server computing device 106 establishes a chat-based communication session with a user's client computing device 102*a*-102*b* via VA module 106*a*. When the session is established, server computing device 106 can transmit one or more messages to client computing device 102*a*-102*b* that greet the user and ask the user how the VA module 106*a* can help. The user at client computing device 102*a*-102*b* can submit one or more input utterances that relate to the purpose for initiating the chat-based communication session. VA module 106*a* receives the utterances and transmits the utterances to NLP processor 106*b*. NLP processor 106*b* generates (step 206) a response to one or more of the input utterances received from the client computing device by executing the combined NLU artifact 114 on the input utterances.

Figure 5:
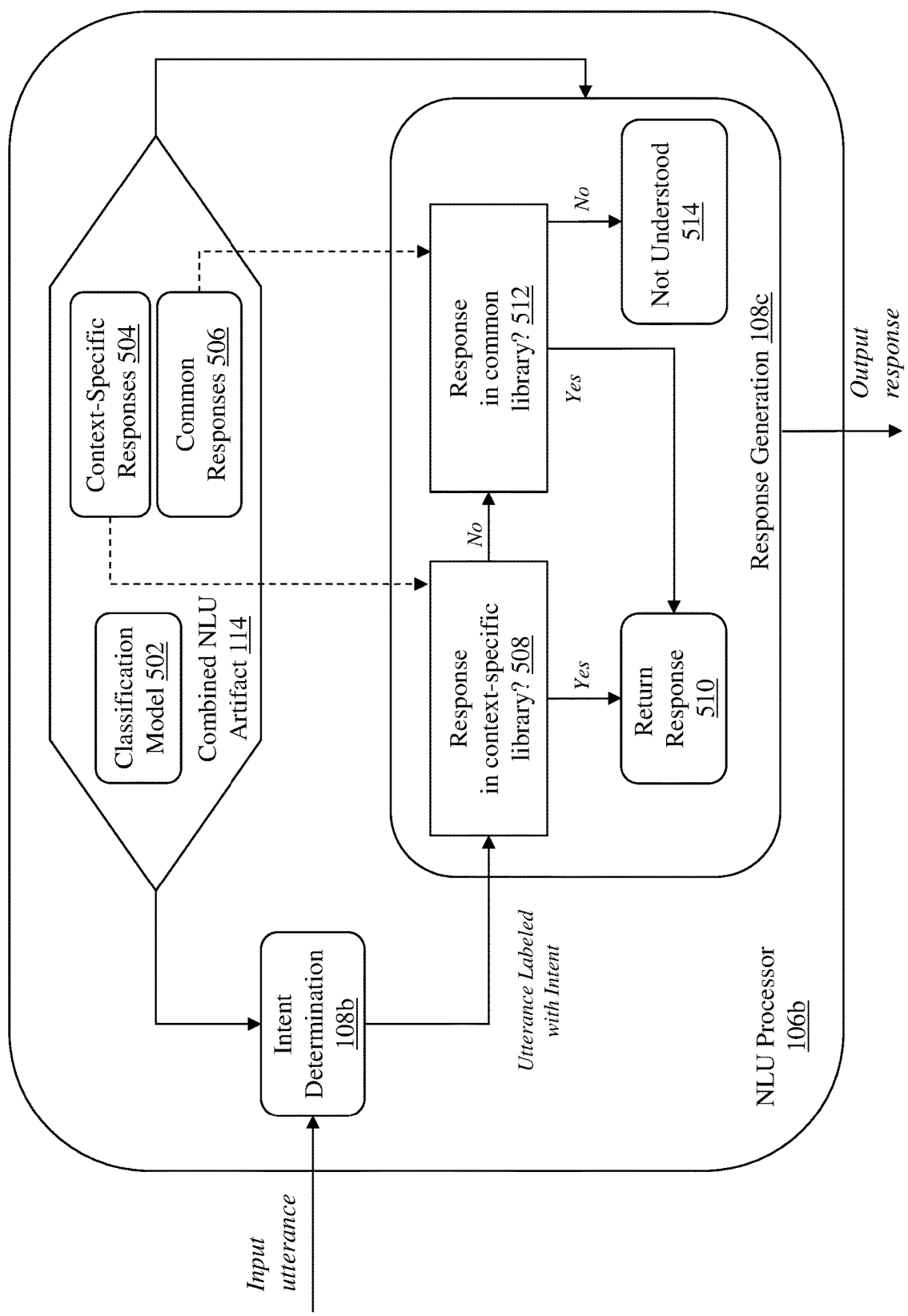
FIG. 5 is a detailed flow diagram of NLP processor illustrating the intent determination and response generation processes.

FIG. 5 is a detailed flow diagram 500 of NLP processor 106*b* illustrating the intent determination and response generation processes. As shown in FIG. 5, intent determination module 108*b* of NLP processor 106*b* receives an input utterance from, e.g., VA module 106*a* and determines (step 206*a*) a user intent associated with the input utterance using the classification model 502 of combined NLU artifact 114. In some embodiments, the input utterance is received as a text string and module 108*b* converts the text string into an embedding (using word2vec, GloVe, or other similar algorithms) or other format that can be used with classification model 502. Module 108*b* executes classification model 502 on the input utterance and generates a predicted user intent based upon the utterance. Module 108*b* labels the utterance with the user intent and transmits the labeled utterance to response generation module 108*c*.

Response generation module 108*c* uses the labeled utterance to locate (step 206*b*) a response associated with the user intent in one or more of the context-specific response library 504 and the common response library 506 of common NLU artifact 114. In some embodiments, module 108*c* first determines (508) whether a response exists in the context-specific response library 504. For example, module 108*c* searches library 504 to determine whether one or more responses are mapped to the intent generated by module 108*b*. When response generation module 108*c* identifies a valid response in the context-specific response library 504, module 108*c* provides (510) the identified response to, e.g., VA module 106*a* for transmission to client computing device 102*a*-102*b* in response to the utterance.

When a response is not found in context-specific response library 504, module 108*c* then determines (512) whether a response exists in the common response library 506. For example, module 108*c* searches library 506 to determine whether one or more responses are mapped to the intent generated by module 108*b*. When response generation module 108*c* identifies a valid response in the common response library 506, module 108*c* provides (510) the identified response to, e.g., VA module 106*a* for transmission to client computing device 102*a*-102*b* in response to the utterance.

However, when a response is also not found in common response library 506, response generation module 108*c* can determine that the input utterance is incomprehensible or not understood (514). In some embodiments, module 108*c* can return a default response message in the event that an utterance is not understood. For example, the default response may be a message that asks the user to repeat the utterance and/or a message that informs the user the utterance was not recognized or comprehended. It should be appreciated that other types of default responses can be included as part of the incomprehension process.

Turning back to FIG. 2, upon receiving a response from NLP processor 106*b*, VA module 106*a* generates and transmits (208) the response as a message to client computing device 102*a*-102*b*, thereby continuing the conversation flow with the user of client computing device 102*a*-102*b*. In some embodiments, VA module 106*b* can retrieve additional information to be included in the response message, such as personalization details (e.g., user's name) or other types of external data. In some embodiments, the response message is received by client computing device 102*a*-102*b* for display to the user on, e.g., a screen of client computing device 102*a*-102*b* or for playback to the user via a text-to-speech algorithm and loudspeaker.

Also, in some embodiments, when a response to the input utterance is found in the common response library, response generation module 108*c* can store these responses for subsequent re-training of the classification model of combined NLU artifact 114 and/or the common NLU artifact 110*a*-110*n* used to create the combined NLU artifact. As a result, the combined NLU artifact 114 continually leverages production output to enhance the robustness and accuracy of the model predictions.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for integrating common and context-specific natural language understanding (NLU) processing in a virtual assistant application, the system comprising a server computing device having a memory that stores computer-executable instructions and a processor that executes the computer-executable instructions to:
    identify a common NLU processing unit comprising (i) a common NLU classification model trained using common NLU training data to determine user intent from an input utterance and (ii) a common response library comprising a plurality of common responses applicable to a plurality of different contexts and each configured to satisfy a user intent;
    build a combined NLU processing unit based upon the common NLU classification model and a context-specific NLU classification model, the combined NLU processing unit comprising (i) a combined NLU classification model trained using the common NLU training data and context-specific NLU training data to determine user intent from an input utterance, (ii) the common response library and (iii) a context-specific response library comprising a plurality of context-specific responses applicable to a single context each configured to satisfy a user intent;
    generate, using the combined NLU processing unit, a response to an input utterance captured from a user of a client computing device, comprising:
        determining a user intent associated with the input utterance using the combined NLU classification model, and
        locating a response that satisfies the user intent in one or more of the context-specific response library and the common response library; and
    transmit the located response to the client computing device.

2. The system of claim 1, wherein the server computing device creates the combined NLU classification model by:
    merging the common NLU training data with the context-specific NLU training data; and
    training a new NLU classification model to determine user intent from an input utterance using the merged training data set.

3. The system of claim 1, wherein the input utterance is captured from the client computing device during a virtual assistant communication session.

4. The system of claim 3, wherein determining a user intent associated with the input utterance using the combined NLU classification model comprises:
    applying the combined NLU classification model to the input utterance to generate a predicted user intent for the input utterance; and
    labeling the input utterance with the predicted user intent.

5. The system of claim 4, wherein locating a response associated with the user intent in one or more of the context-specific response library and the common response library comprises:
    locating a first response associated with the user intent in the context-specific response library; and
    locating a second response associated with the user intent in the common response library when a first response is not located in the context-specific response library.

6. The system of claim 5, wherein the client computing device outputs the located response to a user of the client computing device via a virtual assistant application on the client computing device.

7. The system of claim 5, wherein when a first response is not located in the context-specific response library and a second response is not located in the common response library, the server computing device returns a default response.

8. The system of claim 7, wherein the default response indicates to a user of the client computing device that the user intent is not understood.

9. The system of claim 1, wherein identifying a common NLU processing unit comprises:
    selecting a common NLU processing unit from a plurality of common NLU processing units, each associated with a different version number.

10. A computerized method of integrating common and context-specific natural language understanding (NLU) processing in a virtual assistant application, the method comprising:
    identifying, by the server computing device, a common NLU processing unit comprising (i) a common NLU classification model trained using common NLU training data to determine user intent from an input utterance and (ii) a common response library comprising a plurality of common responses applicable to a plurality of different contexts and each configured to satisfy a user intent;
    building, by the server computing device, a combined NLU processing unit based upon the common NLU classification model and a context-specific NLU classification model, the combined NLU processing unit comprising (i) a combined NLU classification model trained using the common NLU training data and context-specific NLU training data to determine user intent from an input utterance, (ii) the common response library and (iii) a context-specific response library comprising a plurality of context-specific applicable to a single context each configured to satisfy a user intent;
    generating, by the server computing device using the combined NLU processing unit, a response to an input utterance captured from a user of a client computing device, comprising:
        determining a user intent that satisfies the input utterance using the combined NLU classification model, and
        locating a response associated with the user intent in one or more of the context-specific response library and the common response library; and
    transmitting, by the server computing device, the located response to the client computing device.

11. The method of claim 10, wherein the server computing device creates the combined NLU classification model by:
    merging the common NLU training data with the context-specific NLU training data; and training a new NLU classification model to determine user intent from an input utterance using the merged training data set.

12. The method of claim 10, wherein the input utterance is captured from the client computing device during a virtual assistant communication session.

13. The method of claim 12, wherein determining a user intent associated with the input utterance using the combined NLU classification model comprises:

applying the combined NLU classification model to the input utterance to generate a predicted user intent for the input utterance; and labeling the input utterance with the predicted user intent.

14. The method of claim 13, wherein locating a response associated with the user intent in one or more of the context-specific response library and the common response library comprises:

locating a first response associated with the user intent in the context-specific response library; and locating a second response associated with the user intent in the common response library when a first response is not located in the context-specific response library.

15. The method of claim 14, wherein the client computing device outputs the located response to a user of the client computing device via a virtual assistant application on the client computing device.

16. The method of claim 14, wherein when a first response is not located in the context-specific response library and a second response is not located in the common response library, the server computing device returns a default response.

17. The method of claim 16, wherein the default response indicates to a user of the client computing device that the user intent is not understood.

18. The method of claim 10, wherein identifying a common NLU processing unit comprises:

selecting a common NLU processing unit from a plurality of common NLU processing units, each associated with a different version number.

* * * * *